United States Patent
Planeta et al.

(10) Patent No.: US 10,016,911 B2
(45) Date of Patent: Jul. 10, 2018

(54) TOOTHED MIXING FOR SCREW EXTRUDERS

(71) Applicant: Macro Technology Inc., Mississauga, Ontario (CA)

(72) Inventors: Miroslav Planeta, Mississauga (CA); Hassan Eslami, Mississauga (CA)

(73) Assignee: Macro Technology Inc., Ontario (CA)

( * ) Notice: Subject to any disclaimer, the term of this patent is extended or adjusted under 35 U.S.C. 154(b) by 392 days.

(21) Appl. No.: 14/918,628

(22) Filed: Oct. 21, 2015

(65) Prior Publication Data

US 2017/0113378 A1    Apr. 27, 2017

(51) Int. Cl.
*B29B 7/40*    (2006.01)

(52) U.S. Cl.
CPC .................... *B29B 7/402* (2013.01)

(58) Field of Classification Search
USPC ........................................................ 366/99
See application file for complete search history.

(56) References Cited

U.S. PATENT DOCUMENTS

| | | | | |
|---|---|---|---|---|
| 4,556,324 A | * | 12/1985 | Tynan | B01F 7/042 366/301 |
| 5,669,710 A | * | 9/1997 | Schebesta | B01F 7/042 366/147 |
| 2012/0306370 A1 | * | 12/2012 | Van De Ven | H05B 33/0866 315/113 |
| 2014/0102233 A1 | * | 4/2014 | Hsu | F16H 55/08 74/412 R |

* cited by examiner

*Primary Examiner* — Mark Halpern
(74) *Attorney, Agent, or Firm* — Eversheds Sutherland (US) LLP

(57) ABSTRACT

A mixing section for an extrusion screw comprises a shaft having at least one set of spaced-apart cuspidate shaft teeth, with the shaft teeth extending radially outwardly from a root of the shaft. Each of the shaft teeth comprises a flank face and a rake face opposite the flank face, with the tooth transitioning between the flank face and the rake face at an outermost cusp. Some embodiments have one or more longitudinally extending, longitudinally spaced series of annular sets of circumferentially spaced shaft teeth. Some embodiments have one or more helically extending series of spaced-apart cuspidate shaft teeth. The mixing section may be received in a mixing section barrel to form a mixing portion of a screw extruder.

14 Claims, 8 Drawing Sheets

SECTION 10-10

SECTION 11-11

US 10,016,911 B2

TOOTHED MIXING FOR SCREW EXTRUDERS

TECHNICAL FIELD

The present disclosure relates to extruders, and more particularly to extrusion screws for melt extruders.

BACKGROUND OF THE INVENTION

Conventionally, an extrusion screw for a melt extruder comprises an elongate shaft (root) with a helical thread (flight) extending therealong, and comprises a feed section, a melting section (also called a transition section), a metering section and a mixing section. The melting or transition section is disposed between the feed section and the metering section, and the metering section is disposed between the melting or transition section and the mixing section. The extrusion screw is driven to rotate within a smooth-bored barrel.

Plastic, typically as pellets, is fed into the barrel at the feed section and carried into the melt or transition section by the movement of the helical threads, where the plastic melts and begins to mix, and then into the metering section, which advances the molten plastic at a desired rate into the mixing section, where it is thoroughly mixed and can be extruded at the appropriate rate through an extrusion aperture.

The lead or pitch of the thread may vary along the length of the screw to impart the described characteristics; for example, the lead and pitch may be larger in the feed section than in the melting section and larger in the melting section than in the mixing section.

It is known in the prior art to provide an extrusion screw in which the shaft of the mixing section has, instead of threading, a longitudinally extending, longitudinally spaced series of annular sets of circumferentially spaced teeth, with the teeth being of generally rectangular parallepipedic shape and extending radially outwardly from the shaft.

SUMMARY OF THE INVENTION

In one aspect, the present disclosure is directed to a mixing section for an extrusion screw. The mixing section comprises a shaft having at least one longitudinally extending, longitudinally spaced series of annular sets of circumferentially spaced cuspidate shaft teeth. The shaft teeth extend radially outwardly from a root of the shaft. Each of the shaft teeth comprises a flank face and a rake face opposite the flank face, with the tooth transitioning between the flank face and the rake face at an outermost cusp.

In some embodiments, for each of the shaft teeth, the flank face is generally convex.

In some embodiments, for each of the shaft teeth, the rake face is generally concave.

In some embodiments, each of the shaft teeth includes a generally concave transition surface between the root of the shaft and the respective flank face.

In certain embodiments, for all sets of circumferentially spaced shaft teeth, all of the teeth are arranged with their rake faces oriented toward the first circumferential direction. In other embodiments, for a first group of annular sets of circumferentially spaced shaft teeth, all of the teeth are arranged with their rake faces oriented toward a first circumferential direction, and for a second group of annular sets of circumferentially spaced shaft teeth, all of the teeth are arranged with their rake faces oriented toward a second circumferential direction opposite to the first circumferential direction.

In some embodiments, within each annular set of circumferentially spaced shaft teeth, the shaft teeth alternate between radially shorter shaft teeth and radially longer shaft teeth.

A mixing portion of a screw extruder may comprise a mixing section as described above, together with a mixing section barrel. The mixing section barrel comprises a mixing section housing with a bore extending through the mixing section housing. The mixing section housing has a longitudinally extending, longitudinally spaced series of annular sets of circumferentially spaced barrel teeth, with the barrel teeth extending inwardly into the bore, and the mixing section is rotatable within the mixing section barrel. The annular sets of circumferentially spaced shaft teeth are interposed between adjacent ones of the annular sets of circumferentially spaced barrel teeth.

The barrel teeth may be generally rectangular in cross-section. The barrel teeth may be formed between circumferentially spaced, longitudinally extending grooves formed in the bore and longitudinally spaced annular grooves formed in the bore.

In another aspect, the present disclosure is directed to a mixing section for an extrusion screw. The mixing section comprises a shaft having at least one helically extending series of spaced-apart cuspidate shaft teeth, with the shaft teeth extending radially outwardly from a root of the shaft. Each of the shaft teeth comprises a flank face and a rake face opposite the flank face, with the tooth transitioning between the flank face and the rake face at an outermost cusp.

In some embodiments, for each of the shaft teeth, the flank face is generally convex.

In some embodiments, for each of the shaft teeth, the rake face is generally concave.

In some embodiments, each of the shaft teeth includes a generally concave transition surface between the root of the shaft and the respective flank face.

In certain embodiments, for all helically extending series of shaft teeth, all of the shaft teeth are arranged with their rake faces oriented toward a common helical direction. In other embodiments, within each helically extending series of shaft teeth, the shaft teeth alternate between radially shorter shaft teeth and radially longer shaft teeth.

BRIEF DESCRIPTION OF THE DRAWINGS

These and other features will become more apparent from the following description in which reference is made to the appended drawings wherein.

DETAILED DESCRIPTION

Figure 1:
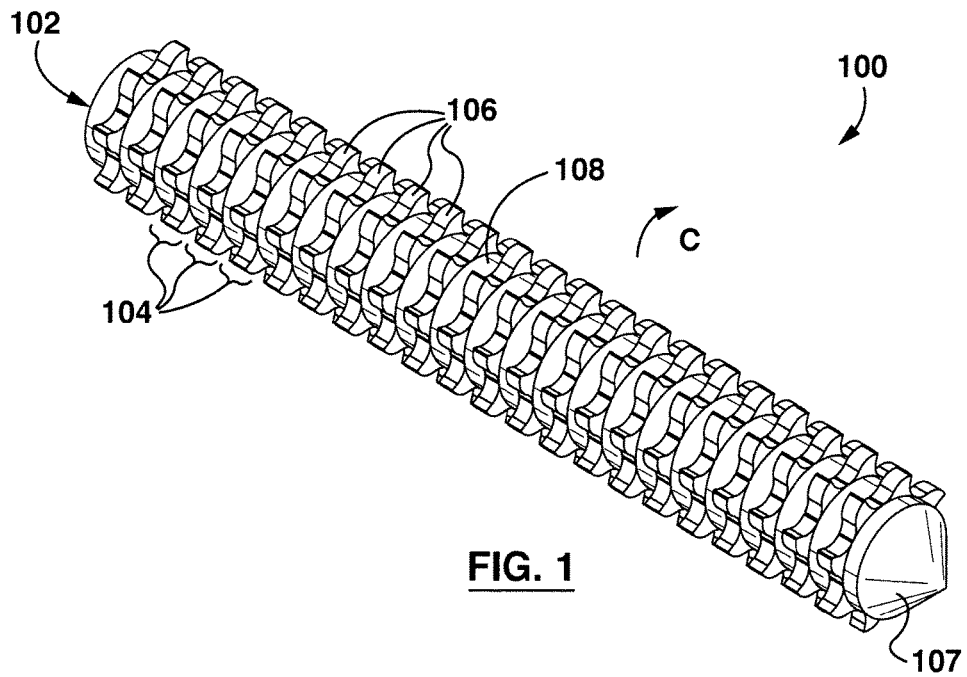
FIG. 1 is a perspective view of a first exemplary mixing section for an extrusion screw.

Reference is now made to FIG. 1, which shows a first exemplary mixing section 100 for an extrusion screw. The mixing section 100 comprises a shaft 102 which has a longitudinally extending, longitudinally spaced series of annular sets or rings 104 of circumferentially spaced shaft teeth 106. The shaft has a conical tip 107 at an extrusion end thereof, that is, the end that will be closest to the extrusion orifice of the extruder. The shaft teeth 106 extend radially outwardly from the root 108 of the shaft 102.

Figure 3:
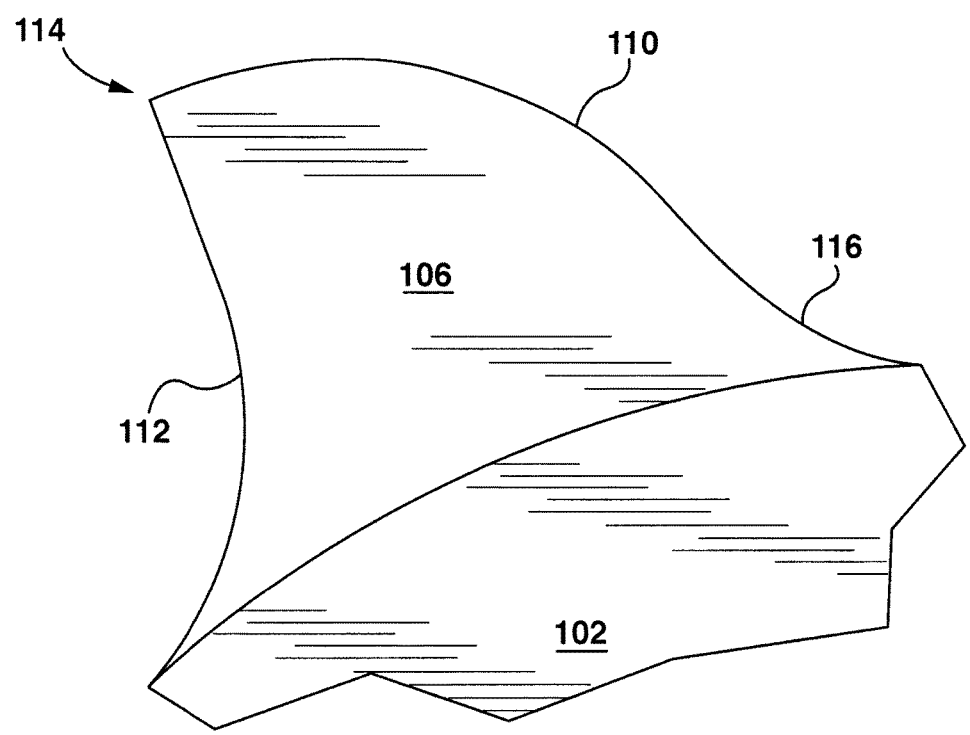
FIG. 3 shows a portion of the mixing section of FIG. 1 including a profile view of a shaft tooth thereof.
Figure 3A:
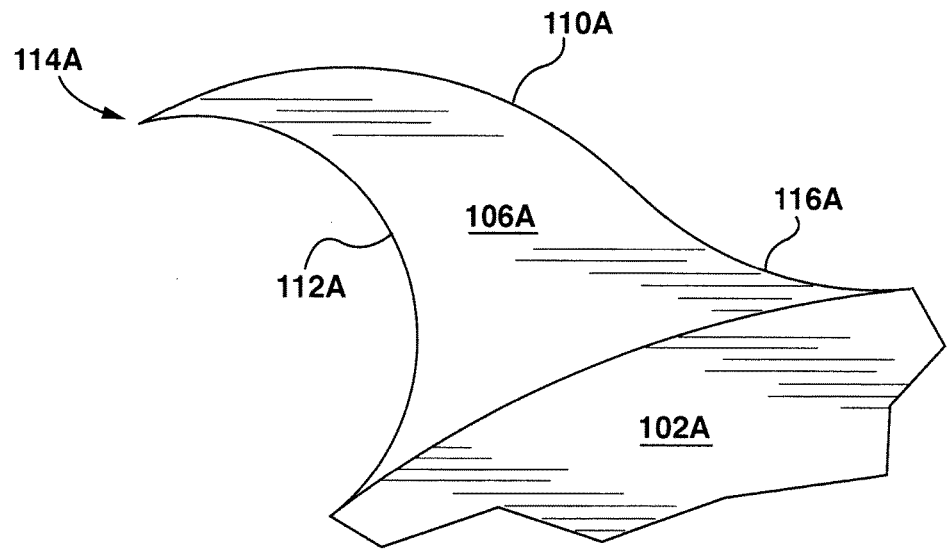
FIG. 3A shows a profile view of a second exemplary shaft tooth.
Figure 3B:
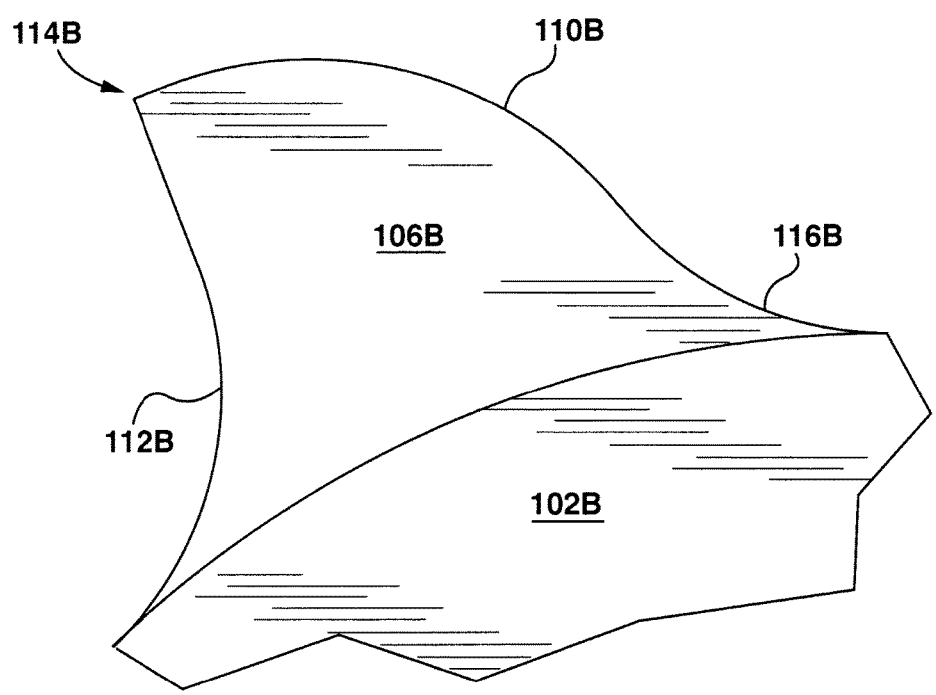
FIG. 3B shows a profile view of a third exemplary shaft tooth.
Figure 3C:
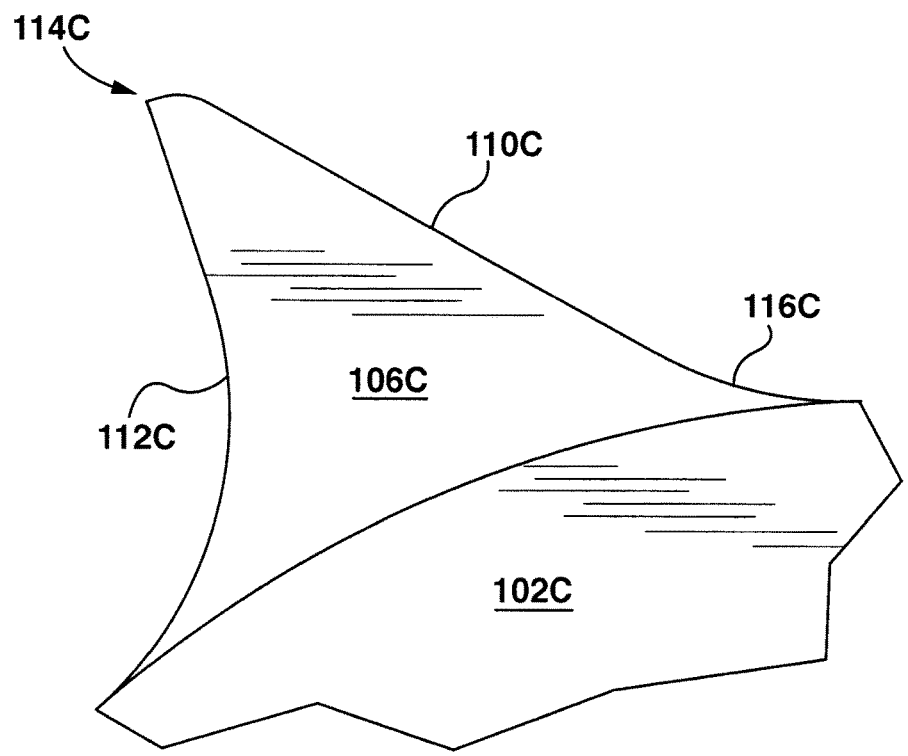
FIG. 3C shows a profile view of a fourth exemplary shaft tooth.
Figure 3D:
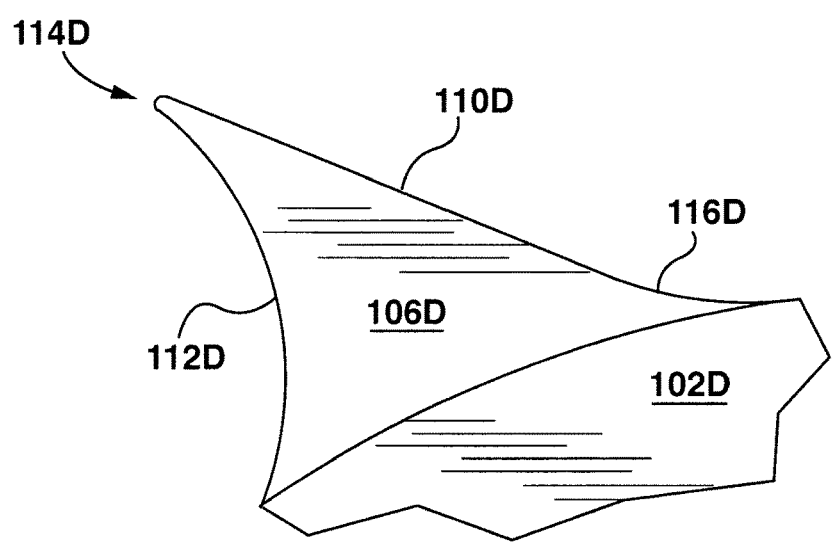
FIG. 3D shows a profile view of a fifth exemplary shaft tooth.

As can best be seen in FIG. 3, each of the shaft teeth 106 is cuspidate in profile, and comprises a flank face 110 and a rake face 112 opposite the flank face 110, with the shaft tooth 106 transitioning between the flank face 110 and the rake face 112 at a single outermost cusp 114. In the illustrated embodiment, the flank face 110 is generally convex and the rake face 112 is generally concave with a substantially planar portion toward the cusp 114. A generally concave transition surface 116 is provided between the root 108 of the shaft 102 and the flank face 110. In other embodiments, the shaft teeth may have other suitable cuspidate profile shapes. FIGS. 3A to 3E show alternate embodiments of exemplary cuspidate shaft teeth 106A to 106E, respectively, with like reference numerals denoting like features but with the respective suffixes "A", "B", "C", "D" and "E". Each of the shaft teeth 106A to 106E comprises a flank face 110A, 110B, 110C, 110D, 110E and a rake face 112A, 112B, 112C, 112D, 112E opposite the flank face 110A, 110B, 110C, 110D, 110E, with the shaft tooth 106A to 106E transitioning between the flank face 110A, 110B, 110C, 110D, 110E and the rake face 112A, 112B, 112C, 112D, 112E at a single outermost cusp 114A, 114B, 114C, 114D, 114E. In some embodiments, one or both of the flank face and the rake face may be generally planar. For example, the exemplary shaft teeth 106C and 106D in FIGS. 3C and 3D, respectively, have generally planar flank faces 110C, 110D. Each of the shaft teeth 106 and 106A to 106E is cuspidate in profile in that the shaft teeth 106 and 106A to 106E narrow to a point, i.e. cusp 114, 114A, 114B, 114C, 114D, 114E, as the shaft teeth 106 and 106A to 106E extend from the root of the shaft. FIGS. 3 to 3C and 3D show shaft teeth 106, 106A, 106B, 106C and 106E having sharp cusps 114, 114A, 114B, 114C and 114E while FIG. 3D shows a shaft tooth 106D having a rounded cusp 114D. The shaft teeth 106 and 106A to 106E shown in the drawings are merely exemplary, and are not intended to be exhaustive as shaft teeth according to the present disclosure may have any suitable cuspidate profile shape. It will also be appreciated that a single mixing section may have shaft teeth of different cuspidate shapes.

Figure 3E:
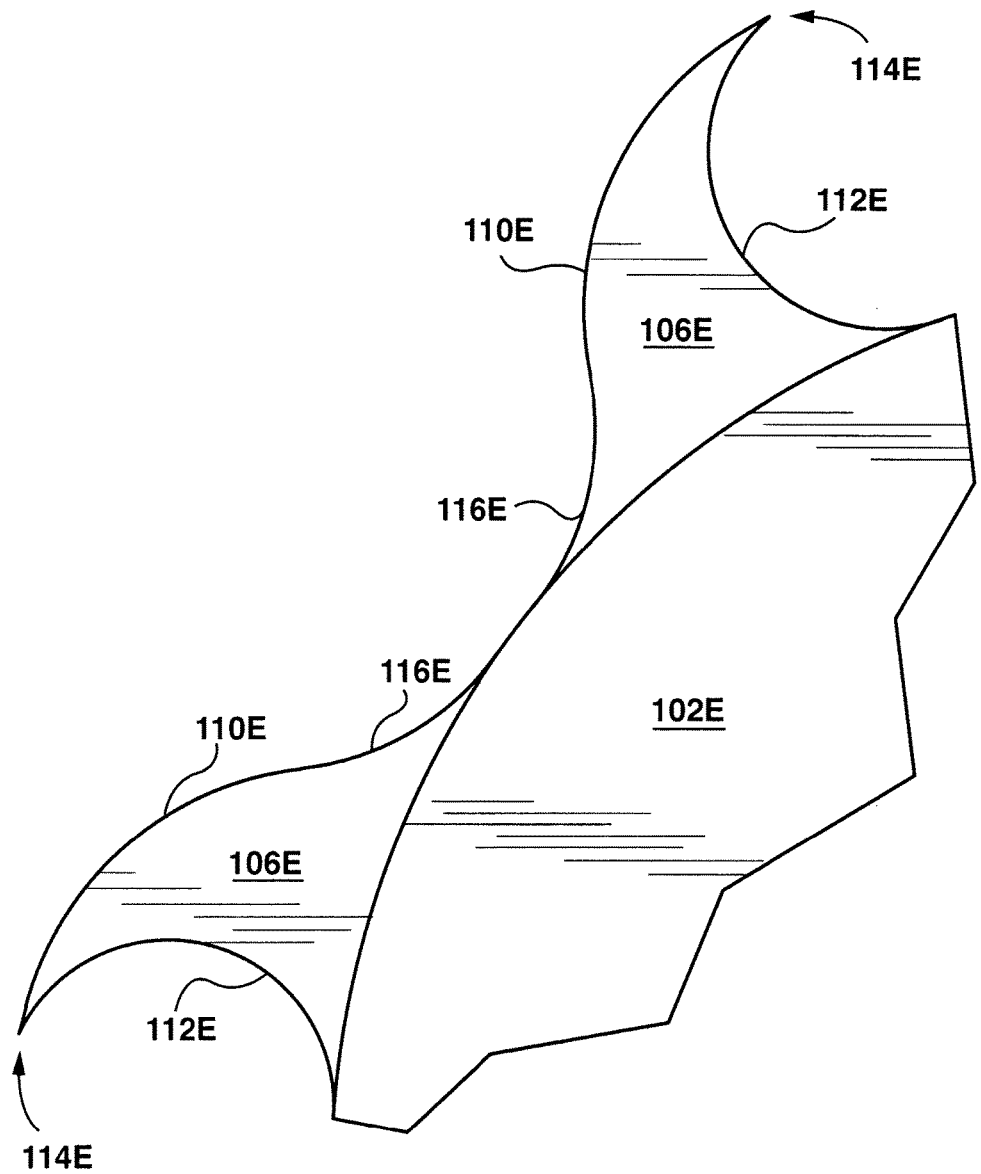
FIG. 3E shows profile views of two adjacent sixth exemplary shaft teeth.

Referring again to FIG. 1, in the illustrated embodiment, all of the shaft teeth 106 are arranged with their rake faces 112 (FIG. 3) oriented toward a first circumferential direction, denoted by arrow "C". In other embodiments, a first group of annular sets of circumferentially spaced shaft teeth may have all of the shaft teeth arranged with their rake faces oriented toward a first circumferential direction, and a second group of annular sets of circumferentially spaced shaft teeth may have all of the shaft teeth arranged with their rake faces oriented toward a second circumferential direction opposite to the first circumferential direction. For example, alternating rings of shaft teeth may face in opposite circumferential directions, or consecutive series of two or three rings of shaft teeth may face in the first circumferential direction and every third or every fourth ring of shaft teeth may face in the second circumferential direction. In still further embodiments, shaft teeth within the same ring may face in different circumferential directions, as shown in FIG. 3E. In each of the aforementioned embodiments, the shaft teeth 106 are oriented perpendicularly to the axis of the shaft 102; in other embodiments the orientation of the shaft teeth relative to the shaft may vary, either within a given ring, between rings, or both.

Figure 2:
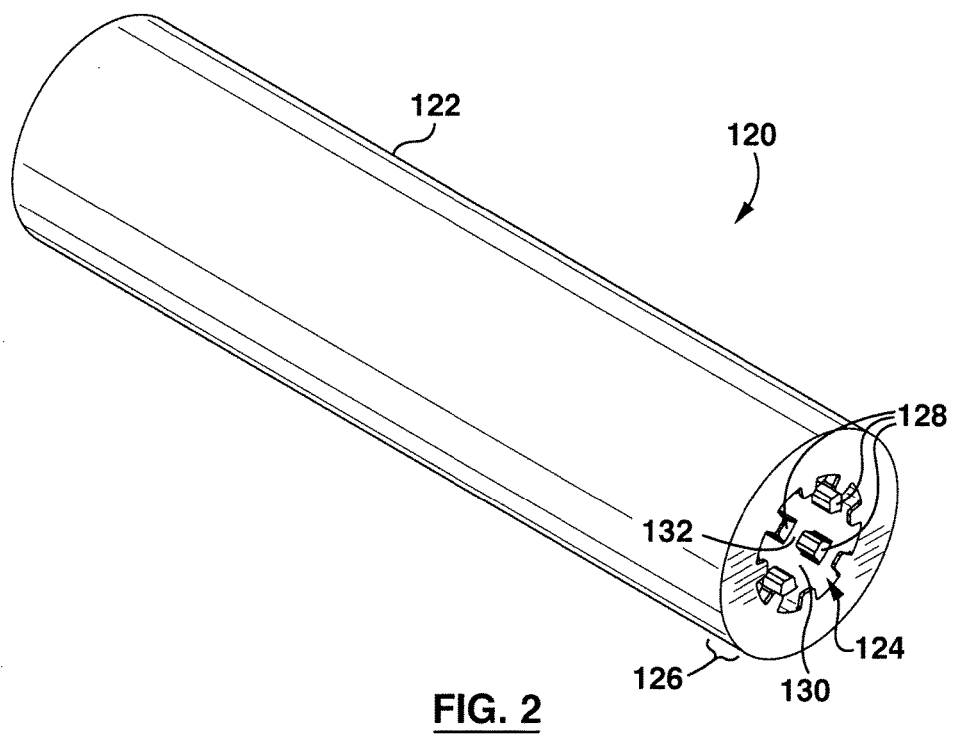
FIG. 2 is a perspective view of a first exemplary mixing section barrel for a mixing portion of a screw extruder.
Figure 4:
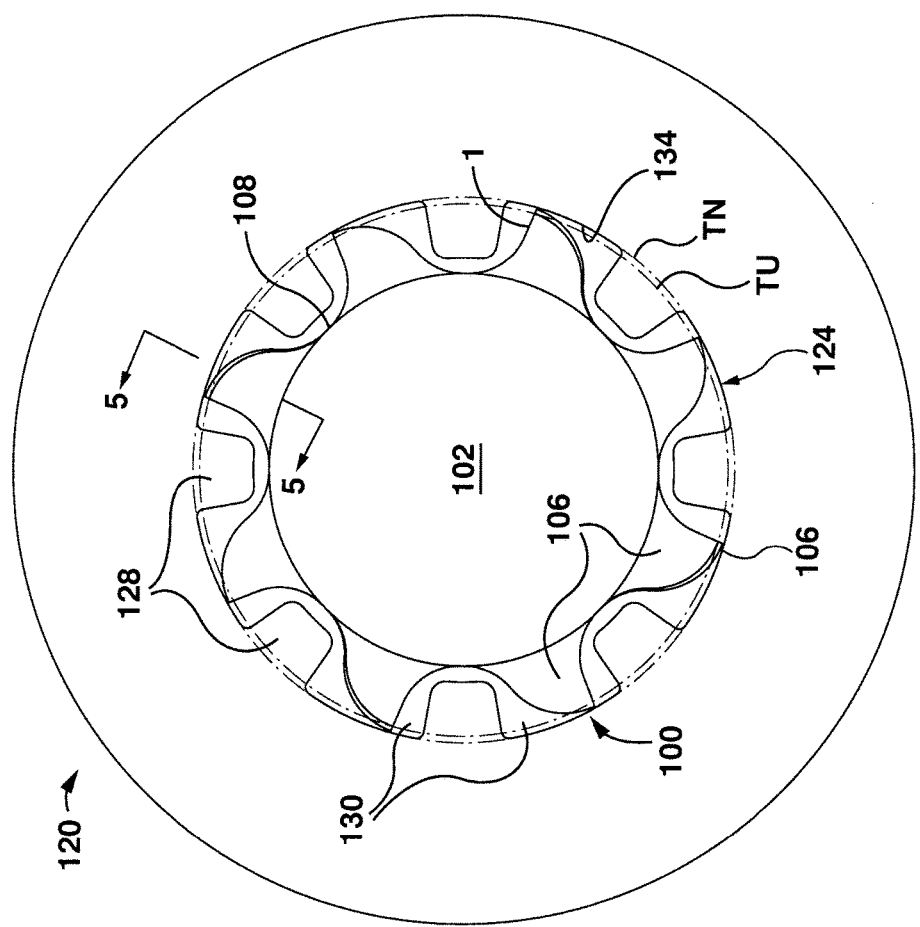
FIG. 4 is an end view showing the mixing section of FIG. 1 received in the barrel of FIG. 2.
Figure 6:
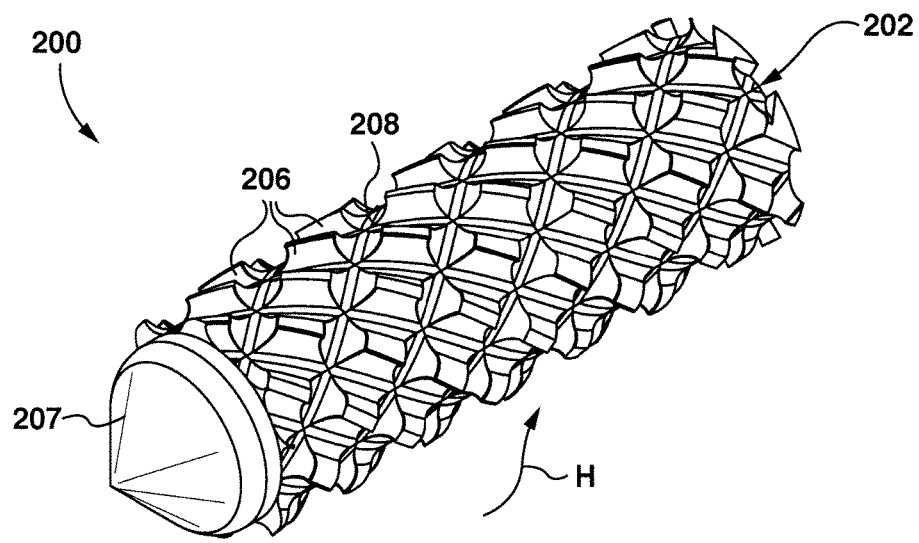
FIG. 6 is a perspective view of a second exemplary mixing section for an extrusion screw.

The mixing section 100 may be received in a mixing section barrel 120, shown in FIG. 2, to form a mixing portion of a screw extruder. The mixing section barrel 120 comprises a mixing section housing 122, with a bore 124 extending through the mixing section housing 122. The mixing section housing 122 has a longitudinally extending, longitudinally spaced series of annular sets 126 of circumferentially spaced barrel teeth 128 extending radially inwardly into the bore 124. In the illustrated embodiment, the barrel teeth 128 are formed between intersecting circumferentially spaced, longitudinally extending grooves 130 formed in the bore 124 and longitudinally spaced annular grooves 132 formed in the bore 124. As can be seen in FIG. 4, in the illustrated embodiment the barrel teeth 128 have a bilaterally symmetrical trapezoid shape, with rounded corners, when viewed in the axial direction along the mixing section barrel 120 and as such will be generally rectangular in cross-section. The mixing section barrel 120 is merely one preferred embodiment, and a mixing section according to the present disclosure may also be used with a smoothbore barrel.

As can be seen in FIG. 1, in the illustrated embodiment the rings 104 of shaft teeth 106 are arranged so that all of the shaft teeth 106 are substantially in axial registration with one another; this enables the mixing section 100 to be installed in the mixing section barrel 120 by aligning the shaft teeth 106 with the gaps between the barrel teeth 128 and moving the mixing section 100 axially into the mixing section barrel 120. This alignment can be seen in FIG. 4. The mixing section 100 is received in the mixing section barrel 120 so that the annular sets 104 of shaft teeth 106 are interposed between adjacent annular sets 126 of barrel teeth 128 and the mixing section 100 is rotatable within the mixing section barrel 120. In one preferred embodiment, all of the shaft teeth 106 are arranged with their rake faces 112 oriented toward the first circumferential direction C and the mixing section 100 is rotated in the first circumferential direction C.

Figure 5:
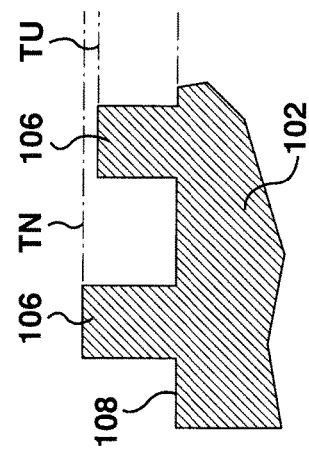
FIG. 5 is a partial cross-sectional view of the mixing section of FIG. 2, taken along the line 5-5 in FIG. 4.

Reference is now made specifically to FIGS. 4 and 5. Preferably, within each annular set 104 of circumferentially spaced shaft teeth, the shaft teeth 106 alternate between radially shorter shaft teeth 106 and radially longer shaft teeth 106. The radially shorter shaft teeth 106 are referred to as "undercut" shaft teeth 106, and the radially longer shaft teeth 106 are referred to as "normal" shaft teeth 106. The radial height of the undercut shaft teeth 106 is shown by dot-dash-dot line TU, and radial height of the normal shaft teeth 106 is shown by dot-dash-dot line TN. Thus, the clearance between the undercut shaft teeth 106 and the inner surface 134 (between the barrel teeth 128) of the mixing section barrel 120 will be greater than the clearance between the normal shaft teeth 106 and the inner 134 surface of the mixing section barrel 120. In the illustrated embodiment, within each ring 102 of shaft teeth 106, every other shaft tooth 106 is an undercut shaft tooth; in other embodiments every third shaft tooth or every fourth shaft tooth may be undercut. Also in the illustrated embodiment, the positions of the undercut shaft teeth 106 in each ring 104 are circumferentially offset relative to each adjacent ring 104, so that each undercut shaft tooth 106 is in axial registration with a normal shaft tooth 106 in each adjacent ring 104, and vice versa. Thus, in FIG. 4; a portion of the normal shaft teeth 106 can be seen behind the undercut shaft teeth 106.

Without being limited by theory, and without promise of any particular utility, it is believed that the use of both normal and undercut shaft teeth results in the shaft teeth 106 exchanging relatively colder material from adjacent the inner surface 134 of the mixing section barrel 120 with relatively warmer material toward the root 108 of the shaft 102 to facilitate a thermally homogenous mix. In particular, it is believed (again without being limited by theory and without promise of any particular utility) that the normal shaft teeth 106 scrape molten material from the inner surface of the mixing section barrel 120 toward the root 108 of the shaft 102 while the undercut teeth 106 move molten plastic away from the root 108 toward the inner surface of the mixing section barrel 120. The undercut teeth 106 may also apply additional shear forces to the molten plastic material to enhance mixing. The molten plastic material is advanced axially by pressure applied by the metering section.

In a conventional screw mixer for an extruder, a typical clearance between the screw flight and the inner surface of the barrel in the mixing section is approximately 0.001 D, where "D" is the diameter of the barrel, and a similar clearance can be used for the normal shaft teeth. For example, in a mixing section having a barrel with a bore that is 5 inches in diameter, the clearance between the normal shaft teeth 106 and the inner surface 134 of the mixing section barrel 120 may be about 0.006 inches. In such an embodiment, the clearance between the undercut shaft teeth 106 and the inner surface 134 of the mixing section barrel 120 may be anywhere from about 0.007 inches to about 0.200 inches, preferably between about 0.030 inches to about 0.080 inches. Similarly, in a mixing section having a barrel with a bore that is 2.5 inches in diameter, the clearance between the normal shaft teeth 106 and the inner surface 134 of the mixing section barrel 120 may be about 0.002 inches and the clearance between the undercut shaft teeth 106 and the inner surface 134 of the mixing section barrel 120 may be anywhere from about 0.003 inches to about 0.150 inches, preferably between about 0.020 inches to about 0.070 inches.

Reference is now made to FIGS. 6 and 8 to 12, which show aspects of a second exemplary mixing section 200 which is similar in concept to the first exemplary mixing section 100 described above except that the shaft teeth are arranged helically rather than in annular sets. Thus, the second exemplary mixing section 200 comprises a shaft 202 having several helically extending series of spaced-apart cuspidate shaft teeth 206 each extending radially outwardly from a root 208 of the shaft 202. The shaft 202 has a conical tip 207 at an extrusion end thereof. The cuspidate profile shape of the shaft teeth 206 is most clearly visible in FIGS. 9, 10 and 11, which also show that each of the shaft teeth 206 comprises a flank face 210 and a rake face 212 opposite the flank face 210 and transitions between the flank face 110 and the rake face 212 at a cusp 214. In the illustrated embodiment, the flank face 210 is generally convex and the rake face 212 is generally concave, and there is a generally concave transition surface 216 between the root 208 of the shaft 202 and the flank face 210. The shaft teeth may have other suitable cuspidate shapes as well; for example, in alternate embodiments one or both of the flank face and the rake face may be generally planar.

Figure 9:
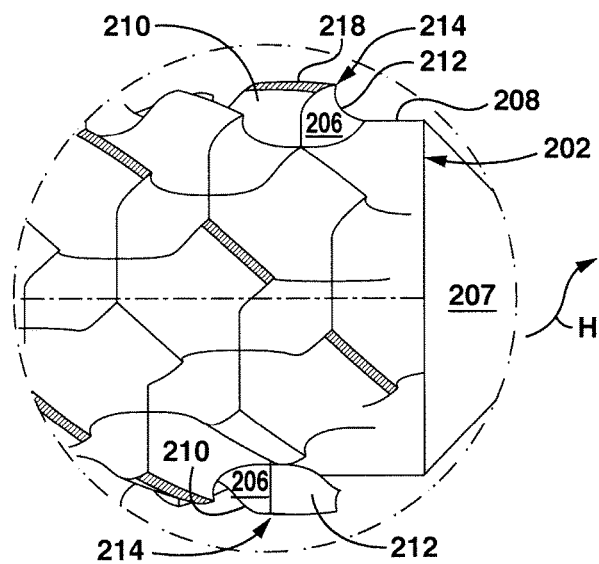
FIG. 9 is a detail view of a portion of FIG. 7.

As can best be seen in FIG. 9, in the illustrated embodiment, for each helically extending series of shaft teeth 206, all of the shaft teeth 206 are arranged with their rake faces 212 oriented in a common helical direction, denoted by arrow H. In the illustrated embodiment, the common helical direction H is the helical direction of the helically extending series of shaft teeth 206; in other embodiments the shaft teeth may be arranged with their rake faces oriented in a common helical direction that is different from the helical direction of the helically extending series of shaft teeth. In other embodiments, some of the shaft teeth may be arranged with their rake faces oriented in a first helical direction, e.g. the helical direction of the helically extending series of shaft teeth, and other shaft teeth may be arranged with their rake faces oriented in a second helical direction opposite the first helical direction. In further alternate embodiments, the shaft teeth may be arranged with their rake faces oriented in a common circumferential direction, or with some teeth oriented in a first circumferential direction and other teeth oriented in a second circumferential direction. In still further embodiments, the orientation of the rake faces of some or all of the shaft teeth may vary depending on the helical position or circumferential position of the respective shaft tooth, or may otherwise vary.

Figure 7:
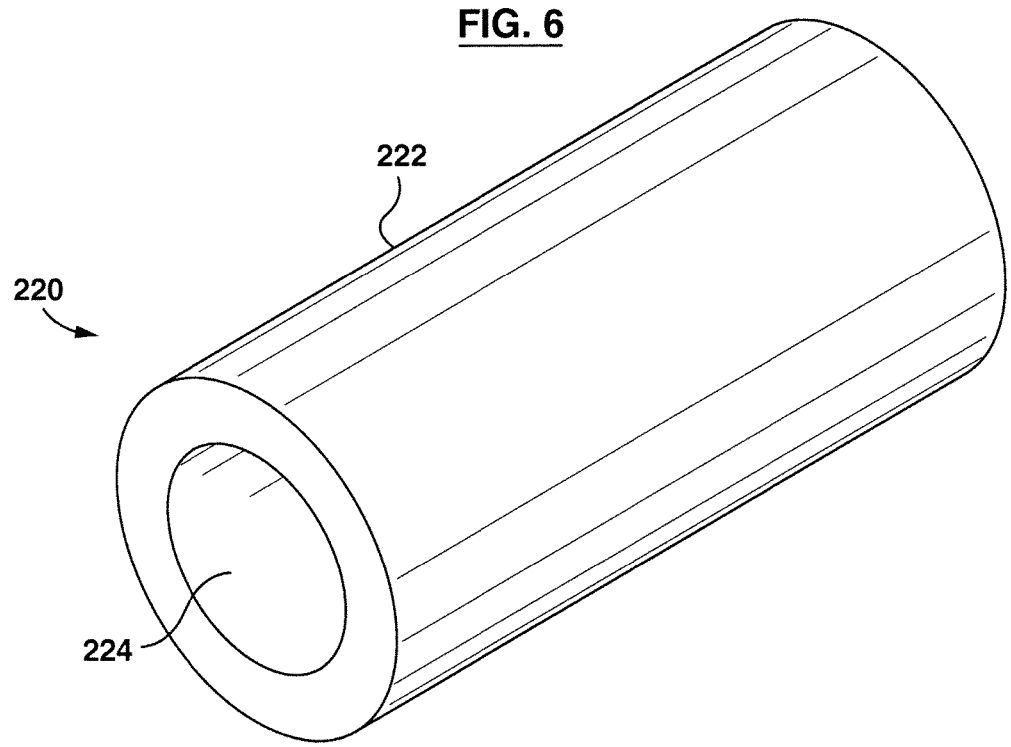
FIG. 7 is a perspective view of a second exemplary mixing section barrel for a mixing portion of a screw extruder.
Figure 8:
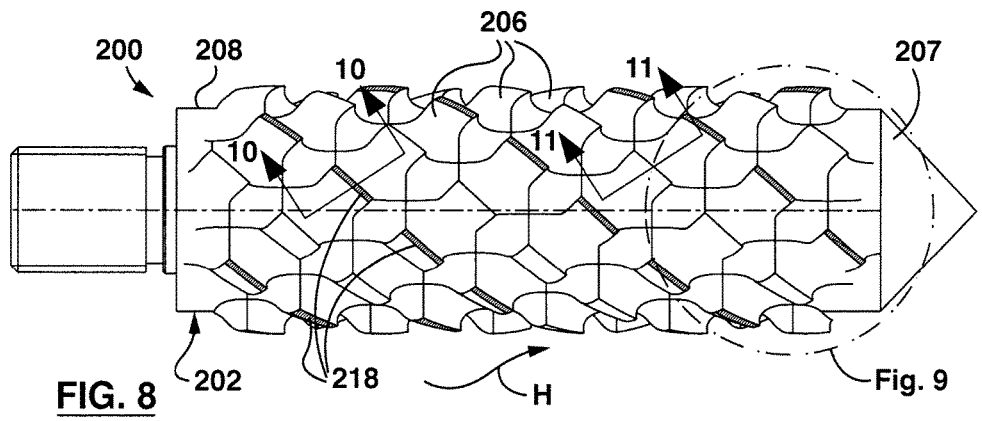
FIG. 8 is a side elevation view of the mixing section of FIG. 6 with its end cap removed.
Figure 10:
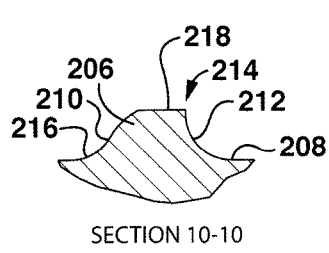
FIG. 10 is a partial cross-sectional view of the mixing section of FIG. 6, taken along the line 10-10 in FIG. 8.
Figure 11:
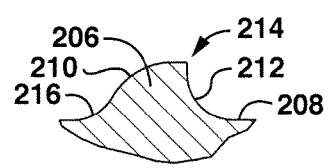
FIG. 11 is a partial cross-sectional view of the mixing section of FIG. 6, taken along the line 11-11 in FIG. 8.

The second mixing section 200 may be received in a mixing section barrel 220, shown in FIG. 7, to form a mixing portion of a screw extruder. The mixing section barrel 220 comprises a mixing section housing 222 with a smooth bore 224 extending through the mixing section housing 222. In the preferred embodiment shown in FIGS. 6 and 8 to 12, within each helically extending series of shaft teeth 206, the shaft teeth 206 alternate between "undercut", i.e. radially shorter shaft teeth 206 whose flank faces 210 have a planar outer surface portion 218 adjacent the cusp 214 and "normal", i.e. radially longer shaft teeth 206. Thus, the undercut shaft teeth 206 will have a greater clearance from the inner surface 234 of the mixing section barrel 120 than the normal shaft teeth 206. An undercut shaft tooth 206 is shown in FIG. 10 and a normal shaft tooth is shown in FIG. 11. Without being limited by theory and without promising any particular utility, the normal shaft teeth 206 and undercut shaft teeth 206 are believed to improve thermal homogeneity in the manner described above. In the illustrated embodiment, in each helical series of shaft teeth, every other shaft tooth 206 is an undercut shaft tooth; in other embodiments every third shaft tooth or every fourth shaft tooth may be undercut. In still further embodiments, the helical series of shaft teeth may alternate between undercut and normal shaft teeth, that is, a first helical series of shaft teeth may consist entirely of undercut shaft teeth and an adjacent second helical series of shaft teeth may consist entirely of normal shaft teeth, and so on.

Certain currently preferred embodiments have been described by way of example. It will be apparent to persons skilled in the art that a number of variations and modifications can be made without departing from the scope of the claims.

What is claimed is:

1. A mixing portion of a screw extruder, the mixing portion comprising:
   a mixing section for an extrusion screw, the mixing section comprising:
      a shaft having at least one longitudinally extending, longitudinally spaced series of annular sets of circumferentially spaced cuspidate shaft teeth, the shaft teeth extending radially outwardly from a root of the shaft;
      each of the shaft teeth comprising:
         a flank face; and
         a rake face opposite the flank face;
         the tooth transitioning between the flank face and the rake face at an outermost cusp; and
   a mixing section barrel, the mixing section barrel comprising:
      a mixing section housing;
      a bore extending through the mixing section housing;
      the mixing section housing having a longitudinally extending, longitudinally spaced series of annular sets of circumferentially spaced barrel teeth;
      the barrel teeth extending inwardly into the bore;
   the mixing section being rotatable within the mixing section barrel;
   wherein the annular sets of circumferentially spaced shaft teeth are interposed between adjacent ones of the annular sets of circumferentially spaced barrel teeth.

2. The mixing portion of the screw extruder of claim 1, wherein for each of the shaft teeth, the flank face is generally convex.

3. The mixing portion of the screw extruder of claim 1, wherein for each of the shaft teeth, the rake face is generally concave.

4. The mixing portion of the screw extruder of claim 1, wherein each of the shaft teeth includes a generally concave transition surface between the root of the shaft and the respective flank face.

5. The mixing portion of the screw extruder of claim 1, wherein:
   for all sets of circumferentially spaced shaft teeth, all of the shaft teeth are arranged with their rake faces oriented toward a first circumferential direction.

6. The mixing portion of the screw extruder of claim 1, wherein:
   for a first group of annular sets of circumferentially spaced shaft teeth, all of the shaft teeth are arranged with their rake faces oriented toward a first circumferential direction;
   for a second group of annular sets of circumferentially spaced shaft teeth, all of the shaft teeth are arranged with their rake faces oriented toward a second circumferential direction;
   the second circumferential direction being opposite to the first circumferential direction.

7. The mixing portion of the screw extruder of claim 1, wherein:
   within each annular set of circumferentially spaced shaft teeth, the shaft teeth alternate between radially shorter shaft teeth and radially longer shaft teeth.

8. The mixing portion of the screw extruder of claim 1, wherein the barrel teeth are generally rectangular in cross-section.

9. The mixing portion of the screw extruder of claim 1, wherein the barrel teeth are formed between:
   circumferentially spaced, longitudinally extending grooves formed in the bore; and
   longitudinally spaced annular grooves formed in the bore.

10. A mixing section for an extrusion screw, the mixing section comprising:
    a shaft having at least one helically extending series of spaced-apart cuspidate shaft teeth, the shaft teeth extending radially outwardly from a root of the shaft;
    each of the shaft teeth comprising:
       a flank face; and
       a rake face opposite the flank face;
       the tooth transitioning between the flank face and the rake face at an outermost cusp;
    wherein:
    for all helically extending series of shaft teeth, all of the shaft teeth are arranged with their rake faces oriented toward a common helical direction.

11. The mixing section of claim 10, wherein for each of the shaft teeth, the flank face is generally convex.

12. The mixing section of claim 10, wherein for each of the shaft teeth, the rake face is generally concave.

13. The mixing section of claim 10, wherein each of the shaft teeth includes a generally concave transition surface between the root of the shaft and the respective flank face.

14. The mixing section of claim 10, wherein:
    within each helically extending series of shaft teeth, the shaft teeth alternate between radially shorter shaft teeth and radially longer shaft teeth.

* * * * *